(12) United States Patent
Lim

(10) Patent No.: US 9,704,487 B2
(45) Date of Patent: Jul. 11, 2017

(54) SPEECH RECOGNITION SOLUTION BASED ON COMPARISON OF MULTIPLE DIFFERENT SPEECH INPUTS

(71) Applicant: Hyundai Motor Company, Seoul (KR)

(72) Inventor: Kyu Hyung Lim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/954,399

(22) Filed: Nov. 30, 2015

(65) Prior Publication Data

US 2017/0053651 A1 Feb. 23, 2017

(30) Foreign Application Priority Data

Aug. 20, 2015 (KR) .................. 10-2015-0117151

(51) Int. Cl.
*G10L 21/00* (2013.01)
*G10L 15/32* (2013.01)
*G10L 15/22* (2006.01)
*G10L 15/20* (2006.01)
*B60R 16/037* (2006.01)
*G01C 21/36* (2006.01)

(52) U.S. Cl.
CPC .......... *G10L 15/32* (2013.01); *B60R 16/0373* (2013.01); *G01C 21/3664* (2013.01); *G10L 15/20* (2013.01); *G10L 15/22* (2013.01); *G10L 2015/223* (2013.01)

(58) Field of Classification Search
CPC .......................... G10L 15/32; G10L 2015/223
USPC ......................................................... 704/275
See application file for complete search history.

(56) References Cited

U.S. PATENT DOCUMENTS

| 6,219,645 B1 * | 4/2001 | Byers ...................... G10L 15/02 381/91 |
| 6,230,138 B1 * | 5/2001 | Everhart ................. G10L 15/26 454/74 |
| 7,016,836 B1 * | 3/2006 | Yoda ....................... G10L 15/20 455/563 |
| 7,904,300 B2 * | 3/2011 | Abbott .................... G10L 15/30 704/270 |
| 8,589,156 B2 * | 11/2013 | Burke ..................... G10L 15/30 704/231 |
| 2007/0082706 A1 | 4/2007 | Campbell et al. |

(Continued)

FOREIGN PATENT DOCUMENTS

| JP | 2002-116796 | 4/2002 |
| JP | 2005077731 A | 3/2005 |

(Continued)

*Primary Examiner* — Shaun Roberts
(74) *Attorney, Agent, or Firm* — Brinks Gilson & Lione

(57) ABSTRACT

Disclosed herein are speech recognition apparatuses, vehicles having the speech recognition apparatuses, and methods for controlling vehicles. According to an aspect, a speech recognition apparatus includes a speech input unit configured to receive a speech command from a user, a communication unit configured to receive the result of processing for speech recognition acquired by at least one user terminal located near the user, and a controller configured to compare the result of processing for speech recognition acquired from the speech command received by the speech input unit to the result of processing for speech recognition acquired by the at least one user terminal, thus processing the speech command according to the result of the comparison.

17 Claims, 10 Drawing Sheets

(56) References Cited

U.S. PATENT DOCUMENTS

2009/0055180 A1* 2/2009 Coon .................. B60R 16/0373
704/251
2012/0253823 A1* 10/2012 Schalk ............. G08G 1/096877
704/270.1
2013/0073293 A1* 3/2013 Jang ........................ G10L 15/22
704/275

FOREIGN PATENT DOCUMENTS

| JP | 2009025714 | 2/2009 |
| KR | 10-2005-0030906 | 3/2005 |
| KR | 10-2013-0011464 | 1/2013 |
| WO | 2011/121978 | 10/2011 |

* cited by examiner

SPEECH RECOGNITION SOLUTION BASED ON COMPARISON OF MULTIPLE DIFFERENT SPEECH INPUTS

CROSS-REFERENCE TO RELATED APPLICATION

This application claims the benefit of Korean Patent Application No. 10-2015-0117151, filed on Aug. 20, 2015 in the Korean Intellectual Property Office, the disclosure of which is incorporated herein by reference.

FIELD

Forms of the present disclosure relate to a speech recognition apparatus for processing a user's speech command through a speech recognition module, and a vehicle including the same.

BACKGROUND

The statements in this section merely provide background information related to the present disclosure and may not constitute prior art.

Lately, many vehicles include an Audio Video Navigation (AVN) terminal. Generally, the AVN terminal displays a control screen for controlling various devices installed in the vehicle or a screen for executing additional functions that can be executed on the AVN terminal, in addition to providing information about a route to a destination.

A user can manipulate the AVN terminal through a display with a touch screen or a jog shuttle type controller to control various devices in the vehicle, or can input a speech command to a speech recognition module to control various devices in the vehicle. However, when a plurality of passengers exist in the vehicle, it is difficult to exactly recognize a user's speech uttered in narrow space closed due to the other passengers' speeches. Accordingly, studies into technology for raising the accuracy of speech recognition in a vehicle are conducted.

SUMMARY

Additional aspects of the disclosure will be set forth in part in the description which follows and, in part, will be obvious from the description, or may be learned by practice of the disclosure.

In accordance with one aspect of the present disclosure, a speech recognition apparatus includes: a speech input unit configured to receive a speech command from a user; a communication unit configured to receive the result of processing for speech recognition acquired by at least one user terminal located near the user; and a controller configured to compare the result of processing for speech recognition acquired from the speech command received by the speech input unit to the result of processing for speech recognition acquired by the at least one user terminal, thus processing the speech command according to the result of the comparison.

When the speech command is received from the user, the communication unit mat request activation of a speech recognition module of the at least one user terminal located near the user.

The controller may compare a speech waveform acquired from the speech command received by the speech input unit to a speech waveform acquired by the at least one user terminal, and compare the result of speech recognition acquired from the speech command received by the speech input unit to the result of speech recognition acquired by the at least one user terminal, thus processing the speech command according to the results of the comparison.

If the controller determines that a speech waveform acquired from the speech command received by the speech input unit is different from a speech waveform acquired by the at least one user terminal, and that the number of the result of speech recognition acquired from the speech command received by the speech input unit is one, the controller may control a device in the vehicle according to the result of speech recognition acquired from the speech command.

If the controller determines that the speech waveform acquired from the speech command received by the speech input unit is different from the speech waveform acquired by the at least one user terminal, that the result of speech recognition acquired from the speech command received by the speech input unit is one, and that the acquired result of speech recognition is identical to the result of speech recognition acquired by the at least one user terminal, the controller may request the user to again input a speech command.

If the controller determines that a speech waveform acquired from the speech command received by the speech input unit is different from a speech waveform acquired by the at least one user terminal, and that a plurality of results of speech recognition are acquired from the speech command received by the speech input unit, the controller may exclude the result of speech recognition acquired by the at least one user terminal from among the plurality of results of speech recognition.

The controller may control a device in the vehicle to provide a speech recognition result list in which the result of speech recognition acquired by the at least one user terminal is excluded from among the plurality of results of speech recognition.

In accordance with another aspect of the present disclosure, a vehicle includes: a speech recognition module configured to recognize a speech uttered by a user; a communication unit configured to receive the result of processing for speech recognition acquired by at least one user terminal located near the vehicle; and a controller configured to compare the result of processing for speech recognition acquired by the speech recognition module to the result of processing for speech recognition acquired by the user terminal, and to control a device in the vehicle according to the result of the comparison.

When the speech recognition module is activated, the communication unit may request activation of a speech recognition module of the at least one user terminal located near the user.

The controller may compare a waveform of the speech uttered from the user to a speech waveform acquired by the at least one user terminal, compare the result of speech recognition acquired by the speech recognition module to the result of speech recognition acquired by the at least one user terminal, and control the device in the vehicle according to the results of the comparison.

If the controller determines that a waveform of the speech uttered from the user is different from a speech waveform acquired by the at least one user terminal, and that the number of the result of speech recognition acquired by the speech recognition module is one, the controller may control the device in the vehicle according to the result of speech recognition acquired by the speech recognition module.

If the controller determines that a waveform of the speech uttered from the user is different from a speech waveform acquired by the at least one user terminal, that the number of the result of speech recognition acquired by the speech input module is one, and that the acquired result of speech recognition is identical to the result of speech recognition acquired by the at least one user terminal, the controller may request the user to again input a speech.

If the controller determines that a waveform of the speech uttered from the user is different from a speech waveform acquired by the at least one user terminal, and that a plurality of results of speech recognition are acquired by the speech recognition module, the controller may exclude the result of speech recognition acquired by the at least one user terminal from among the plurality of results of speech recognition.

The controller may control the device in the vehicle to provide a speech recognition result list in which the result of speech recognition acquired from the at least one user terminal is excluded from among the plurality of results of speech recognition.

In accordance with another aspect of the present disclosure, a method of controlling a vehicle includes: recognizing a speech uttered from a user; receiving the result of processing for speech recognition acquired by at least one user terminal located near the vehicle; and comparing the result of processing for speech recognition acquired by the speech recognition module to the result of processing for speech recognition acquired by the at least one user terminal, and controlling a device in the vehicle according to the result of the comparison.

The receiving of the result of processing for speech recognition may further include, when the speech recognition module is activated, requesting activation of a speech recognition module of the at least one user terminal located near the user.

The controlling of the device in the vehicle may include comparing a waveform of the speech uttered from the user to a speech waveform acquired by the at least one user terminal, comparing the result of speech recognition acquired by the speech recognition module to the result of speech recognition acquired by the at least one user terminal, and controlling the device in the vehicle according to the results of the comparison.

The controlling of the device in the vehicle may include, if it is determined that a waveform of the speech uttered from the user is different from a speech waveform acquired by the at least one user terminal, and that the number of the result of speech recognition acquired by the speech recognition module is one, controlling the device in the vehicle according to the result of speech recognition acquired by the speech recognition module.

The controlling of the device in the vehicle may include, if it is determined that a waveform of the speech uttered from the user is different from a speech waveform acquired by the at least one user terminal, that the number of the result of speech recognition acquired by the speech recognition module is one, and that the acquired result of speech recognition is identical to the result of speech recognition acquired by the at least one user terminal, requesting the user to again input a speech.

The controlling of the device in the vehicle may include, if it is determined that a waveform of the speech uttered from the user is different from a speech waveform acquired by the at least one user terminal, and that a plurality of results of speech recognition are acquired by the speech recognition module, excluding the result of speech recognition acquired by the at least one user terminal from among the plurality of results of speech recognition.

The controlling of the device in the vehicle may include controlling the device in the vehicle to provide a speech recognition result list in which the result of speech recognition acquired from the at least one user terminal is excluded from among the plurality of results of speech recognition.

Further areas of applicability will become apparent from the description provided herein. It should be understood that the description and specific examples are intended for purposes of illustration only and are not intended to limit the scope of the present disclosure.

DRAWINGS

These and/or other aspects of the disclosure will become apparent and more readily appreciated from the following description of the forms, taken in conjunction with the accompanying drawings of which:

Figure 1:
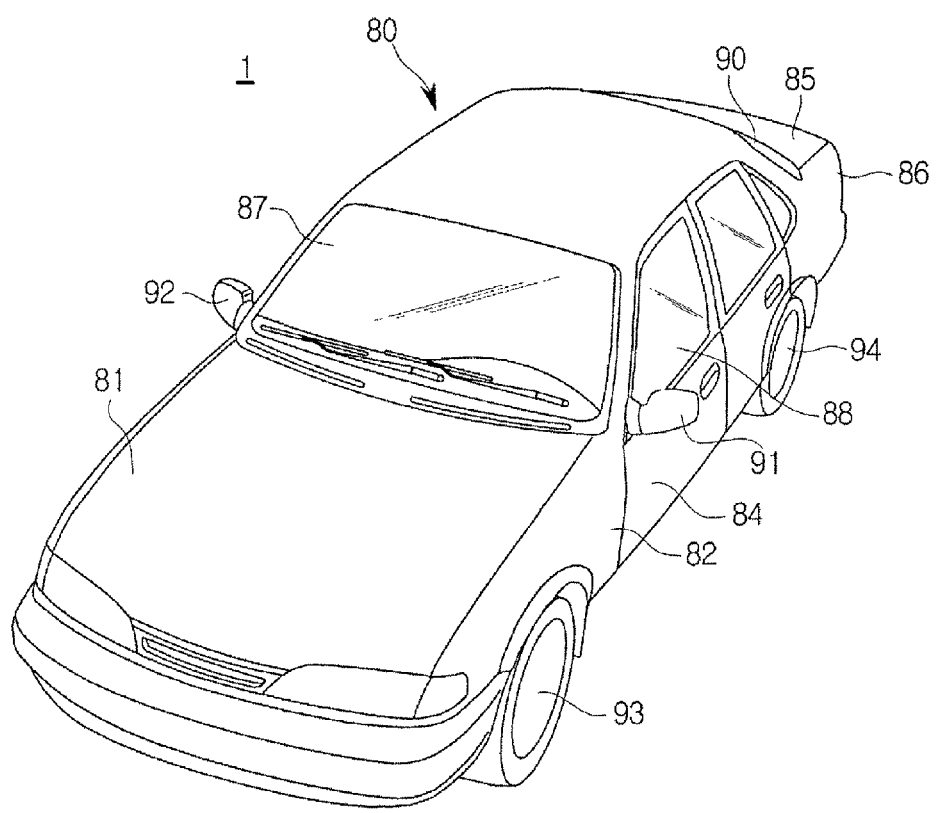
FIG. 1 is a perspective view showing an outer appearance of a vehicle.

The drawings described herein are for illustration purposes only and are not intended to limit the scope of the present disclosure in any way.

DETAILED DESCRIPTION

Reference will now be made in detail to the forms of the present disclosure, examples of which are illustrated in the accompanying drawings, wherein like reference numerals refer to like elements throughout.

Figure 2:
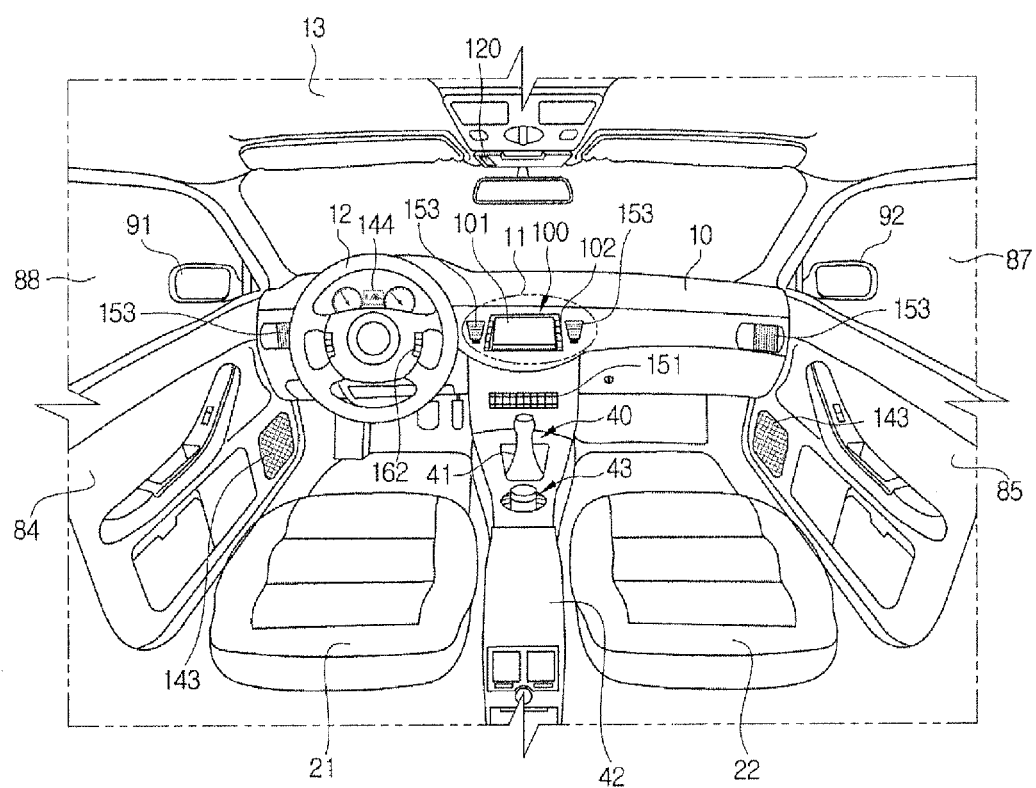
FIG. 2 shows the interior of a vehicle.
Figure 3:
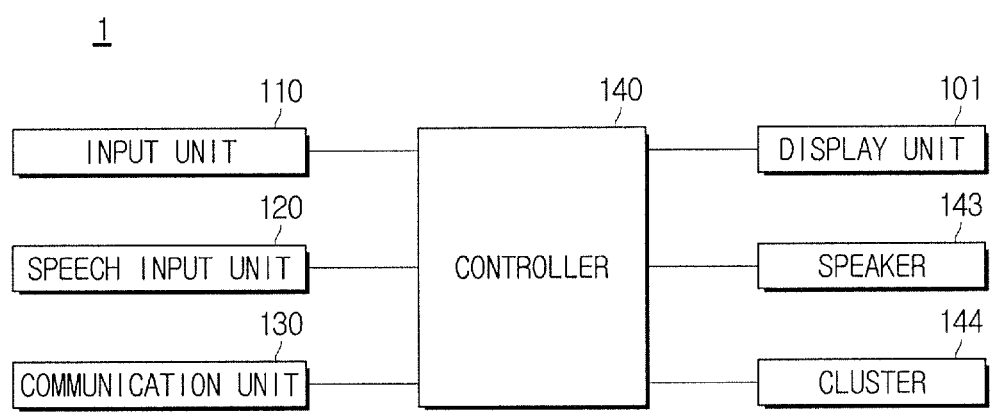
FIG. 3 is a control block diagram of a vehicle that identifies a plurality of users' speeches to process a speech command.

FIG. 1 is a perspective view showing an outer appearance of a vehicle, FIG. 2 shows the interior of a vehicle, and FIG. 3 is a control block diagram of a vehicle that identifies a plurality of users' speeches to process a speech command. Hereinafter, FIGS. 1, 2, and 3 will be referred altogether in order to avoid repeated descriptions.

Referring to FIG. 1, the vehicle 1 may include a body 80 forming an outer appearance of a vehicle 1, and a plurality of wheels 93 and 94 to move the vehicle 1. The body 80 may include a hood 81, a plurality of front fenders 82, a plurality of doors 84, a trunk lid 85, and a plurality of quarter panels 86.

The body 80 may include a front window 87 installed in the front part of the body 80 to provide a front view of the vehicle 1, a plurality of side windows 88 to provide side views of the vehicle 1, a plurality of side-view mirrors 91 and 92 to provide rear and side views of the vehicle 1, and a rear window 90 installed in the rear part of the body 80 to provide a rear view of the vehicle 1. Hereinafter, the interior of the vehicle 1 will be described in detail.

The vehicle 1 may include an air conditioner. The air conditioner is equipment to control air-conditioned environments including indoor/outdoor environmental conditions of the vehicle 1, air intake/exhaust, air circulation, and air-conditioned states, automatically or according to a user's control command. For example, the vehicle 1 may include an air conditioner that can perform both heating and cooling to discharge heated or cooled air through air vents 153 to thus control the inside temperature of the vehicle 1.

Meanwhile, a speech recognition apparatus 100 may be provided inside the vehicle 1. The speech recognition apparatus 100 may recognize a speech command received from a user, and perform a process corresponding to the result of the recognition. Also, the speech recognition apparatus 100 may provide audio and video functions, in addition to a navigation function of providing a user with information about a route to a destination.

The speech recognition apparatus 100 may selectively display at least one of an audio screen, a video screen, and a navigation screen through a display unit 101, and also display various control screens related to the control of the vehicle 1 or screens related to additional functions that can be executed on the AVN terminal 100. According to a form, the speech recognition apparatus 100 may be an Audio Video Navigation (AVN) terminal. However, the speech recognition apparatus 100 is not limited to the AVN terminal, and may be any device capable of recognizing a user's speech command, and performing a processing corresponding to the user's speech command. The speech recognition apparatus 100 may be also called a navigation terminal, or another name used in common by those skilled in the art. According to a form, the speech recognition apparatus 100 may interwork with the air conditioner described above to display various control screens related to the control of the air conditioner through the display unit 101. Also, the speech recognition apparatus 100 may control the operation state of the air conditioner to adjust an air-conditioned environment inside the vehicle 1. Also, the speech recognition apparatus 100 may display a map on which a route to a destination is represented through the display unit 101, although not limited to this.

Meanwhile, the display unit 101 may be positioned in a center fascia 11 which is the central area of a dashboard 10. According to a form, the display unit 101 may be a Liquid Crystal Display (LCD), a Light Emitting Diode (LED) display, a Plasma Display Panel (PDP) display, an Organic Light Emitting Diode (OLED) display, or a Cathode Ray Tube (CRT) display, although not limited to these.

In the interior of the vehicle 1, a speaker 143 may be provided to output sound. Accordingly, the vehicle 1 may output sound required to perform an audio function, a video function, a navigation function, and other additional functions, through the speaker 143. For example, the vehicle 1 may provide a driver with information about a route to a destination, through the speaker 143, although not limited to this.

A navigation input unit 102 may be located in the center fascia 11 which is the central area of the dashboard 10. A driver may manipulate the navigation input unit 102 to input various control commands or information about a destination.

Meanwhile, the navigation input unit 102 may be located close to the display unit 101, and implemented as a hard key type. If the display unit 101 is implemented as a touch screen, the display unit 101 may perform the function of the navigation input unit 102, in addition to a display function.

Meanwhile, a center console 40 may include a center input unit 43 of a jog shuttle type or a hard key type. The center console 40 may be positioned between a driver seat 21 and a passenger seat 22, and include a gear transmission lever 41 and a tray 42. The center input unit 43 may perform all or a part of functions of the navigation input unit 102.

Also, in the interior of the vehicle 1, a cluster 144 may be provided. The cluster 144 is also called an instrument panel. In the following description, for convenience of description, the cluster 144 will be referred to as a "cluster". The cluster 144 may display driving speed of the vehicle 1, Revolutions Per Minute (RPM) of engine, an amount of oil, etc. Also, the cluster 144 may interwork with the speech recognition apparatus 100 to display a driving route, and also display environmental information of roads such as speed limit information.

Also, referring to FIG. 3, the vehicle 1 may include an input unit 110, a speech input unit 120, a communication unit 130, and a controller 140. Herein, the communication unit 130 and the controller 140 may be integrated into at least one System On Chip (SOC) installed in the vehicle 1, and may be operated by a processor. However, if the vehicle 1 includes a plurality of SOCs, the communication unit 130 and the controller 140 may be integrated into the plurality of SOCs.

The input unit 110 may be implemented as the navigation input unit 102 and the center input unit 43. If the display unit 101 is implemented as a touch screen, the display unit 110 may perform the functions of the input unit 110. The input unit 110 may receive various control commands from a driver or a passenger (hereinafter, the driver or the passenger will be referred to as a user). For example, the input unit 110 may receive a command for executing a speech recognition function, as well as commands for executing the functions of specific equipment in the vehicle 1, such as a music search command, a destination search command, etc.

The speech input unit 120 may receive a user's speech command. For example, the speech input unit 120 may be a microphone. The speech input unit 120 may receive a speech command uttered from a driver through a microphone, and convert the speech command into an electrical signal.

According to a form, the speech input unit 188 may be, as shown in FIG. 2, installed on a headlining 13. However, the speech input unit 188 may be installed on the dash board 10, on the steering wheel 12, or on any appropriate location at which a driving user's speech can be effectively received.

Meanwhile, the vehicle 1 may include a communication unit 130. The communication unit 130 may transmit/receive data to/from an external device through a wired/wireless communication network. The wireless communication network enables a device to transmit/receive signals containing data to/from another device in a wireless fashion. For example, the wireless communication network may include a 3Generation (3G) communication network, a 4Generation (4G) communication network, and a Bluetooth communication network, although not limited to these.

Also, the wired communication network enables a device to transmit/receive signals containing data to/from another device in a wired fashion. For example, the wired communication network may include a Peripheral Component Interconnect (PCI), PCI-express, and a Universal Serial Bus (USB), although not limited to these.

Figure 4:
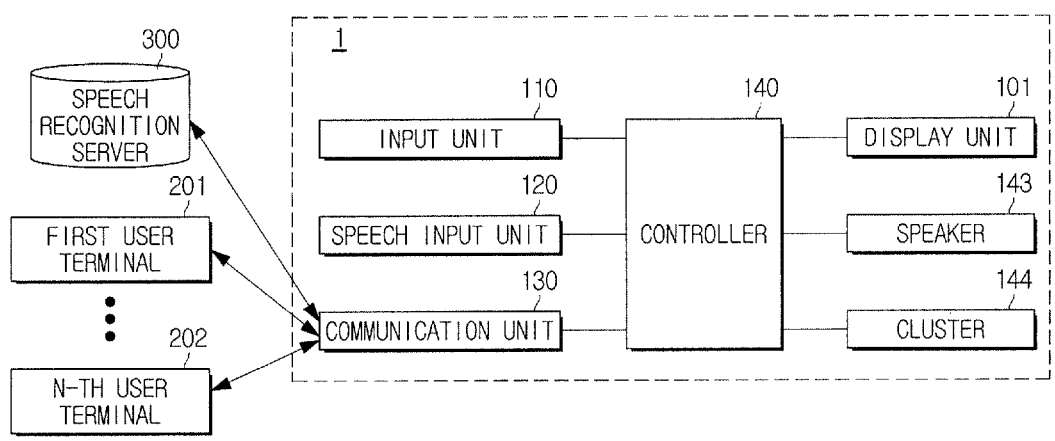
FIG. 4 is a block diagram showing a vehicle, a speech recognition server connected to the vehicle through a communication unit of the vehicle, and a plurality of user terminals.

Referring to FIG. 4, the communication unit 130 may transmit a user's speech command or the result of analysis on the user's speech command to a speech recognition server 300 through a communication network, and receive the result of processing on the user's speech command or the result of the analysis from the speech recognition server 300. For example, the communication unit 130 may transfer a received speech command to the speech recognition server 300, or the result (for example, a waveform, a phenomenon sequence, etc.) of analysis on the received speech command to the speech recognition server 300. Then, the speech recognition server 300 may recognize the user's speech command based on the results of analysis, and transfer the result of speech recognition to the communication unit 130.

Also, the communication unit 130 may transmit/receive data to/from a user terminal through the communication network. Herein, the user terminal may be any terminal having a communication module to transmit/receive data to/from an external terminal through the communication network, and capable of processing the data through a processor. Also, the user terminal may be any terminal having a microphone to receive speech commands, and capable of recognizing and processing the speech commands. According to a form, the user terminal may be a laptop computer, a desktop computer, a tablet Personal Computer (PC), a mobile terminal such as a smart phone and a Personal Digital Assistant (PDA), or a wearable terminal such as a wearable watch and wearable glasses that can be worn on a user's body part, although not limited to these.

The communication unit 130 may transmit/receive various data to/from first to N user terminals 201 to 202, as shown in FIG. 4. The communication unit 130 may receive the results of processing for speech recognition from the individual user terminals 201 to 202. The results of processing for speech recognition may include the results of analysis on a user's speech, performed by speech recognition modules installed in the user terminals 201 to 202 and the speech recognition server 300. For example, the results of processing for speech recognition may include the waveform, recognition result, etc. of a user's speech received by input units of the user terminals 201 to 202, although not limited to these.

The controller 140 may be a processor for performing various operations and control processes, such as a processor installed in the speech recognition apparatus 100, or may be one of various processors well-known in the related art.

Also, the controller 140 may control overall operations of the vehicle 1. More specifically, the controller 140 may control operations of all components (for example, the display unit 101 and the speaker 143) installed in the vehicle 1, as well as various modules such as the speech recognition module installed in the speech recognition apparatus 100. The controller 140 may generate control signals for controlling the components of the vehicle 1 to control the operations of the individual components.

For example, the controller 140 may use a control signal to control operations of the air conditioner or to control operations of the display unit 101 to display various information, although not limited to these. Also, the controller 140 may use a control signal to control various display devices such as the display unit 101 or to control the speaker 143 to provide the user with various information.

Also, the controller 140 may compare the result of speech processing acquired from a user's speech command received by the speech input unit 120, to the result of speech processing acquired by at least one user terminal, to process the user's speech command.

For example, the controller 140 may receive the result of processing on a user's speech command from the speech recognition server 300 through the communication unit 130, as described above. Also, the user terminals 201 to 202 may transmit the results of analysis on a user's speech command received by the speech input units to the speech recognition server 300, and receive the results of processing on the user's speech command from the speech recognition server 300. Then, the user terminals 201 to 202 may transfer the results of processing on the user's speech command to the communication unit 130 through the communication network.

Accordingly, the controller 140 may compare a speech waveform acquired from the speech command received by the speech input unit 120 to a speech waveform acquired by at least one user terminal, and compare the result of speech recognition acquired from the speech command received by the speech input unit 120 to the result of speech recognition acquired by the at least one user terminal, thus processing the user's speech command according to the results of the comparison.

For example, if the controller 140 determines that the speech waveform acquired from the user's speech command received by the speech input unit 120 is similar to the speech waveform acquired by at least one user terminal, the controller 140 may determine that the user's speech command was input to the user terminal existing around the user.

Accordingly, the controller 140 may determine that although the speeches of other users existing around the user act as noise, the speeches do not have influence on speech recognition. Accordingly, the controller 140 may control a device in the vehicle 1 to perform a process corresponding to the result of speech recognition acquired from the speech command received by the speech input unit 120. For example, if the number of the acquired result of speech recognition is one, the controller 140 may control the device in the vehicle 1 to execute a service corresponding to the result of speech recognition. According to a form, if the result of speech recognition is determined that the user executes a destination search service, the controller 140 may control a navigation module to display a destination search screen on the display unit 101.

According to another form, if a plurality of results of speech recognition are acquired, the controller 140 may display a speech recognition result list including the plurality of results of speech recognition on the display unit 101 in order to allow the user to select one from among the plurality of results of speech recognition. For example, if the result of speech recognition is determined that the user speaks "Music", the controller 140 may control the display unit 101 to display a screen for allowing the user to select one service from among a service of turning on the radio, a service of turning on the CD player, and a service of executing a music file stored in memory.

Meanwhile, if the controller 140 determines that the shape of the speech waveform acquired from the speech command received by the speech input unit 120 is different from the shape of the speech waveform acquired by at least one user terminal, the controller 140 may determine that another user's speech or another sound source acts as noise to cause a problem in recognizing the speech command. Accordingly, the controller 140 may perform post-processing on the result of speech recognition to thereby more exactly recognize the user's speech command.

When the controller 140 determines that the shapes of the acquired speech waveforms are identical to each other by a predetermined level or more, the controller 140 may determine that the speech waveforms are similar to each other. Since a speech adds some level of noise when it is input to the speech input unit 120 or the user terminal, the controller 140 may determine, if the shapes of speech waveforms are identical to each other by a predetermined level or more, that the speech waveforms are the same.

For example, if the controller 140 determines that the shape of the speech waveform acquired from the speech command received by the speech input unit 120 is different from the shape of the speech waveform acquired by the at least one user terminal, and that the number of the result of speech recognition acquired from the speech command received by the speech input unit 120 is one, the controller 140 may determine whether the result of speech recognition is included in the result of speech recognition acquired by the user terminal. If the controller 140 determines that the result of speech recognition is not included in the result of speech recognition acquired by the user terminal, the controller 140 may determine that the result of speech recognition is exact, and control a device in the vehicle 1 to perform a process corresponding to the result of speech recognition.

However, if the controller 140 determines that the result of speech recognition is included in the result of speech recognition acquired by the user terminal, the controller 140 may determine that the result of speech recognition results from another user's utterance, and may request the user to again input a speech command. That is, that the same result of speech recognition is acquired by the speech input unit 120 and the user terminal may be determined that a speech uttered by another person not the user is input to both the speech input unit 120 and the user terminal. Accordingly, the controller 140 may determine that the result of speech recognition is not the result acquired from the user's speech command, and request the user to again input a speech command.

According to another example, if the controller 140 determines that the shape of the speech waveform acquired from the speech command received by the speech input unit 120 is different from the shape of the speech waveform acquired by the at least one user terminal, and that a plurality of results of speech recognition are acquired from the speech command received by the speech input unit 120, the controller 140 may determine whether any one of the plurality of results of speech recognition is included in the result of speech recognition acquired by the user terminal. Then, the controller 140 may exclude the result of speech recognition included in the result of speech recognition acquired by the user terminal from the speech recognition result list.

That is, there is high probability that the same result of speech recognition acquired from both devices (that is, the speech input unit 120 and the user terminal) although different speech waveforms are acquired from the devices results from noise generated by another user or a peripheral object, not from the user's speech command. Accordingly, the controller 140 may delete the result of speech recognition included in common in the both devices from the speech recognition result list, thereby providing a speech recognition result list with greater accuracy.

Herein, the result of speech recognition means a service corresponding to a speech command. The result of speech recognition may include all services that can be provided by the vehicle 1. For example, when a specific speech command is received from a user, all services related to the specific speech command may be included in the result of speech recognition acquired from the specific speech command. According to a form, the result of speech recognition may be a destination search service, a music search service, a Digital Multimedia Broadcasting (DMB) service, or a Bluetooth service, which can control one of devices in the vehicle 1 or execute one of various modules installed in the vehicle 1.

Accordingly, the speech recognition result list may be a list of a service(s) that a user is expected to want to execute through analysis on the user's speech command. According to a form, the speech recognition result list may include a service of converting to an air conditioner control screen, a service of executing destination search, and a service of executing DMB. That is, the speech recognition result list may include all services that can be provided through devices in the vehicle 1. The controller 140 may display the speech recognition result list through the display unit 101, and execute a service selected by the user from the speech recognition result list.

Meanwhile, when the result of speech recognition received in common from the both devices is deleted from the speech recognition result list so that the speech recognition result list includes only one result of speech recognition, the controller 140 may execute a service corresponding to the result of speech recognition without displaying the speech recognition result list. That is, since there remains one result of speech recognition, the controller 140 may execute a service corresponding to the result of speech recognition without inducing the user to select the result of speech recognition, in order to improve the user's convenience.

Hereinafter, an example of the operation flow of a vehicle will be described.

Figure 5:
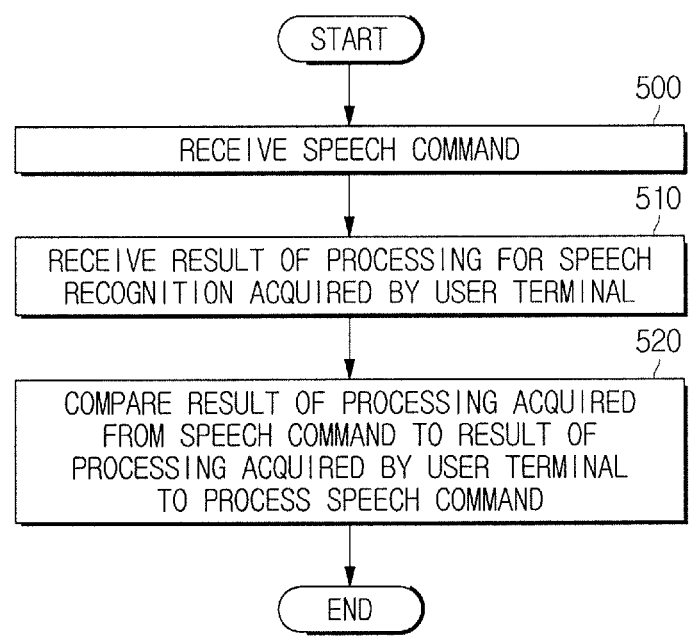
FIG. 5 is a flowchart illustrating a method in which a vehicle identifies a plurality of users' speeches to process a speech command.

FIG. 5 is a flowchart illustrating a method in which a vehicle identifies a plurality of users' speeches to process a speech command.

Referring to FIG. 5, the vehicle may receive a user's speech command, in operation 500. For example, the vehicle may receive an execution command for speech recognition from a user through the speech input unit described above. Then, the vehicle may activate a speech recognition module.

At this time, the vehicle may receive another sensed speech, in addition to the user's speech command, through the speech input unit. Accordingly, the vehicle needs to identify the user's speech command exactly. Thus, the vehicle may activate a speech recognition module of a user terminal located in or near the vehicle through an external server. When the vehicle receives the user's speech command through the speech input unit, the user terminal located in or near the vehicle may also receive a speech sensed from its surroundings. Meanwhile, there are various methods in which the vehicle and the user terminal perform speech recognition through their speech recognition modules.

The vehicle may receive the result of processing for speech recognition from the user terminal located in or near the vehicle, in operation 510. The vehicle may use the received result of processing for speech recognition to more exactly identify the user's speech command.

The vehicle may compare the result of processing for speech recognition acquired by the vehicle to the result of processing for speech recognition acquired by the user terminal to process the user's speech command, in operation 520. For example, the vehicle may compare the shape of a speech waveform acquired from the user's speech command to the shape of a speech waveform acquired by the user terminal. If the vehicle determines that the shape of the speech waveform acquired from the user's speech command is similar to the shape of the speech waveform acquired by the user terminal, the vehicle may determine that the user's speech command was input to the user terminal as well as the vehicle. Then, the vehicle may control a device in the vehicle based on the result of processing for speech recognition acquired by the vehicle to provide a service.

Hereinafter, when the shape of a speech waveform acquired by the speech input unit of the vehicle is different from the shape of a speech waveform acquired by the user terminal, the operation of the vehicle will be described.

For example, when the vehicle receives a user's speech, the vehicle may determine that noise is generated by another person or a certain cause. In this case, the vehicle may use the result of speech processing received from a user terminal to perform post-processing on the result of speech processing by the vehicle. The post-processing means a process of filtering out the result of speech recognition determined to be not acquired from the user's speech from among the results of speech recognition acquired by the vehicle.

If the vehicle has acquired one result of speech recognition, the vehicle may determine whether the acquired result of speech recognition is included in the result of speech recognition acquired by the user terminal. That is, if the same result of speech recognition is acquired by both the vehicle and the user terminal when different speech waveforms are acquired from the vehicle and the user terminal, the vehicle may determine that the result of speech recognition results from peripheral noise, not from the user's speech. Then, the vehicle may request a device in the vehicle to request the user to again input a speech. For example, the vehicle may control a display device, such as a display or a cluster, to display a pop-up message for requesting the user to again input a speech, or may control a speaker to output sound for requesting the user to again input a speech.

Also, if the vehicle has acquired one result of speech recognition, and the result of speech recognition is not included in the result of speech recognition acquired by the user terminal, the vehicle may determine that the acquired result of speech recognition corresponds to the result of speech recognition acquired from the user's speech, and provide a service corresponding to the result of speech recognition.

Meanwhile, if the vehicle has acquired a plurality of results of speech recognition, the vehicle may delete the result of speech recognition acquired by the user terminal from a speech recognition result list including the plurality of results of speech recognition. That is, the vehicle may determine, as noise, the same result of speech recognition acquired from both the vehicle and the user terminal when different speech waveforms are acquired from the vehicle and the user terminal, and delete the result of speech recognition from the speech recognition result list.

If a plurality of results of speech recognition remain in the speech recognition result list even after the same result of speech recognition is deleted from the speech recognition result list, the vehicle may display the speech recognition result list in order to allow the user to select a desired service from the speech recognition result list. That is, the vehicle may leave a final selection with the user to thereby prevent any inconvenience that a service that the user does not want to execute is executed unavoidably. However, if there remains one result of speech recognition in the speech recognition result list, the vehicle may execute a service corresponding to the result of speech recognition without inducing the user to select the result of speech recognition.

Figure 6:
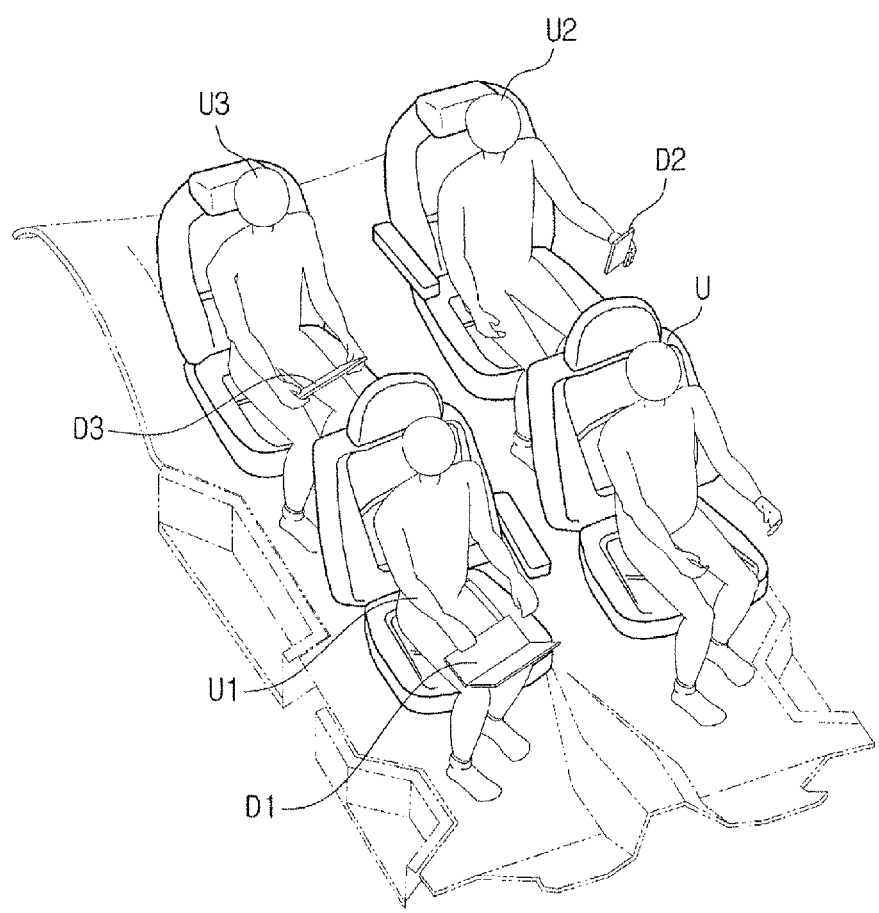
FIG. 6 shows a case in which a plurality of users sit in seats inside a vehicle.
Figure 7:
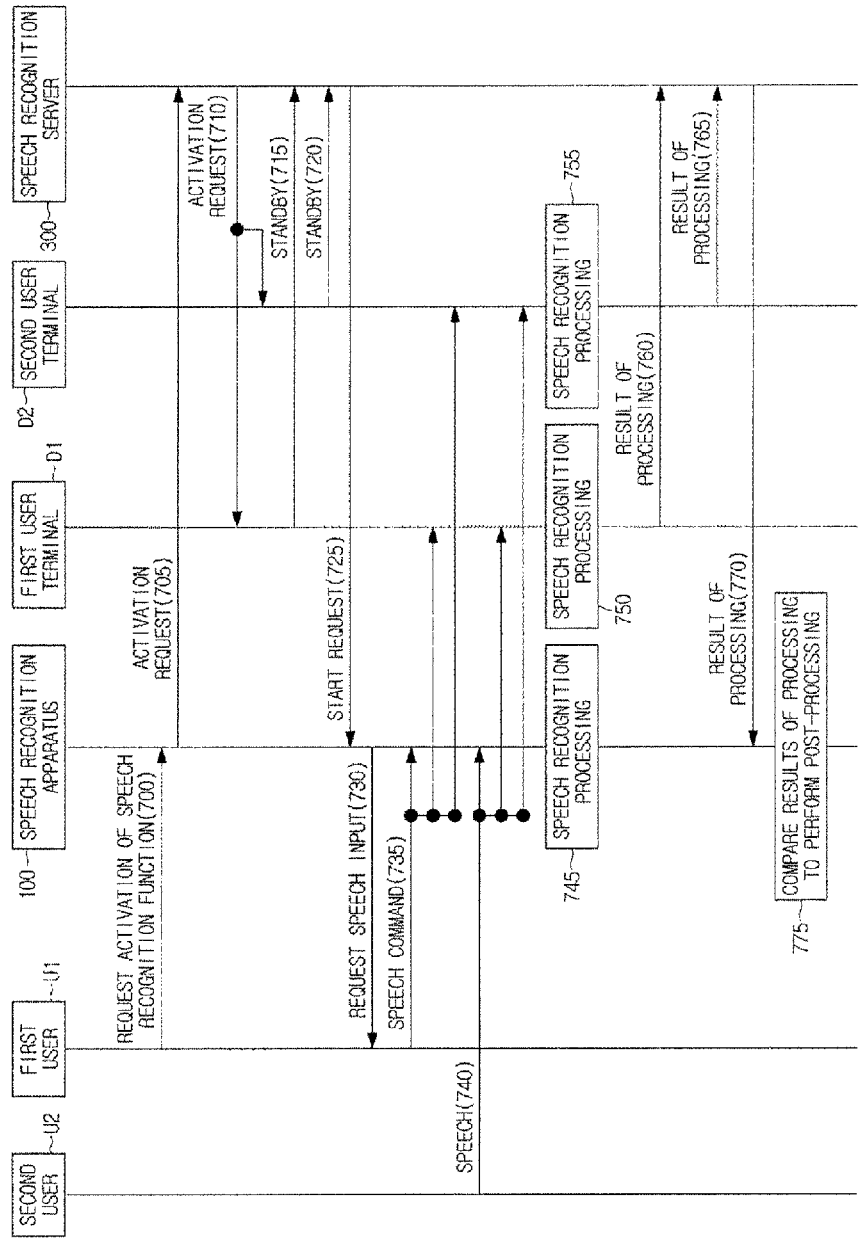
FIG. 7 is a flowchart illustrating a method in which a speech recognition apparatus processes a user's speech command when there are a plurality of users.

FIG. 6 shows a case in which a plurality of users sit in seats inside a vehicle, and FIG. 7 is a flowchart illustrating a method in which a speech recognition apparatus processes a user's speech command when there are a plurality of users.

Referring to FIG. 6, a plurality of users (that is, a user U, a first user U1, a second user U2, and a third user U3) may sit in seats in a vehicle. The first user U1, the second user U2, and the third user U3 may possess their own terminals. For example, the first user U1 may possess a laptop computer D1, the second user U2 may possess a smart phone D2, and the third user U3 may possess a tablet PC D3.

When the user U utters a speech, the other users U1, U2, and U3 in the vehicle may also utter speeches. Since the inside of the vehicle is narrow space closed, the speeches of the other users U1, U2, and U3 as well as the speech of the user U may also be input to the speech input unit of the vehicle. In this case, the vehicle needs to determine the speeches of the other users U1, U2, and U3 except for the speech of the user U, as noise, and to remove the speeches of the other users U1, U2, and U3, in order to exactly recognize the speech of the user U. However, it is difficult to exactly identify the speech of the user U from the speeches of the other users U1, U2, and U3.

Accordingly, the vehicle according to the current form may activate speech recognition modules of the user terminals D1, D2, and D3 located in the vehicle, and use the results of speech recognition and speech waveforms acquired by the speech recognition modules to more exactly recognize the speech of the user U. In the following description, when the first user U1 inputs a speech command through the speech recognition apparatus 100, the operation flow of the vehicle will be described. However, the first user U1, the second user U2, the first user terminal D1, and the second user terminal D2 are not limited to the above-described example.

Referring to FIG. 7, the first user U1 may request the speech recognition apparatus 100 installed in the vehicle to activate the speech recognition module, in operation 700. For example, the first user U1 may input a command for starting the speech recognition module to the speech recognition apparatus 100 through the input unit 110 (see FIG. 3).

The speech recognition apparatus 100 may transfer the activation request to the speech recognition server 300, in operation 705. Then, the speech recognition server 300 may transfer the activation request to the first user terminal D1 and the second user terminal D2 sensed around the speech recognition apparatus 100, in operation 710. Then, the first user terminal D1 and the second user terminal D2 may activate their speech recognition modules, respectively.

According to a form, the speech recognition apparatus 100 may transfer location information of the vehicle estimated through a localization sensor such as Global Positioning System (GPS) or Differential Global Positioning System (DGPS) to the speech recognition server 300, and the speech recognition server 300 may transfer the activation request to the first user terminal D1 and the second user terminal D2 determined to be located in or near the vehicle based on the location information of the vehicle. According to another form, the speech recognition apparatus 100 may identify a user terminal connected through a Bluetooth communication network, based on various information capable of identifying the user terminal, such as an Universally Unique Identifier (UUID) or an address of the user terminal, and activate a speech recognition module of the identified user terminal. However, the speech recognition apparatus 100 may activate a speech recognition module of at least one user terminal located in the vehicle using any other method.

If the speech recognition modules of the first user terminal D1 and the second user terminal D2 are activated so that the first user terminal D1 and the second user terminal D2 is converted into a state in which they can receive a speech, the first user terminal D1 and the second user terminal D2 may transfer information indicating that they are in a standby state to receive a speech, to the speech recognition server 300, in operations 715 and 720. Then, the speech recognition apparatus 100 may receive a start request from the speech recognition server 300, in operation 725, and request the first user U1 to input a speech, in operation 730. For example, the speech recognition apparatus 100 may output beep sound or a speech "Please Speak" through a speaker. Or, the speech recognition apparatus 100 may display a pop-up message including text "Please Speak" through the display unit 101. Then, the first user U1 may input a speech command to the speech recognition apparatus 100, in operation 735.

There is a case in which the second user U2 sat in the vehicle utters a speech, in operation 740. In this case, since the speech recognition modules of the first user terminal D1 and the second user terminal D2 have already been activated, the speech uttered from the second user D2 may be input to the speech recognition apparatus 100, the first user terminal D1, and the second user terminal D2. Accordingly, since the speech of the second user U2 is input to the speech recognition apparatus 100 in addition to the speech of the first user U1, it is difficult to exactly recognize the speech of the first user U1. Accordingly, the speech recognition apparatus 100 according to the current form may identify the speech uttered from the first user U1 using the result of speech recognition and a speech waveform acquired by another user's terminal.

For example, the speech recognition apparatus 100 may perform a speech recognition process on a received speech, in operation 745, and the first user terminal D1 and the second user terminal D2 may also perform a speech recognition process on received speeches, in operations 750 and 755. Then, the first user terminal D1 and the second user terminal D2 may transfer the received speeches or the results of analysis on the received speeches to the speech recognition server 300 to request the speech recognition server 300 to send the results of processing for speech recognition, in operations 760 and 765. Then, the speech recognition apparatus 100 may receive the results of processing for speech recognition from the speech recognition server 300, in operation 770.

For example, the speech recognition apparatus 100 may compare the result of processing for speech recognition acquired by the speech recognition apparatus 100 to the results of processing for speech recognition acquired by the first user terminal D1 and the second user terminal D2 so as to determine whether to use the result of processing for speech recognition acquired by the speech recognition apparatus 100 as it is, and to determine whether to exclude the result determined as noise from the result of processing for speech recognition acquired by the speech recognition apparatus 100, in operation 775. The operation will be described in detail with reference to FIG. 8, below.

Figure 8:
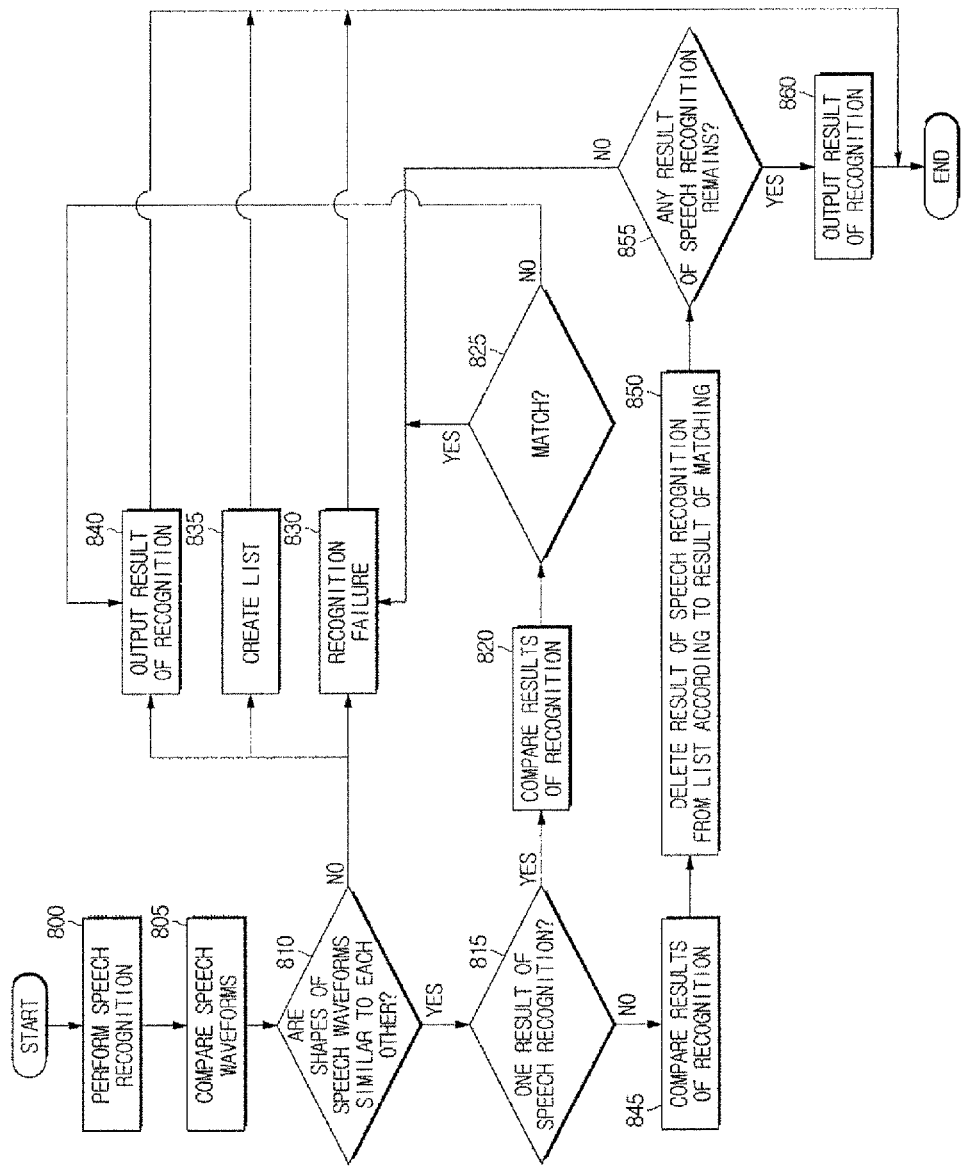
FIG. 8 is a flowchart illustrating a method in which a speech recognition apparatus identifies a user's speech command based on the results of processing acquired by a plurality of terminals and processes the user's speech command.
Figure 9:
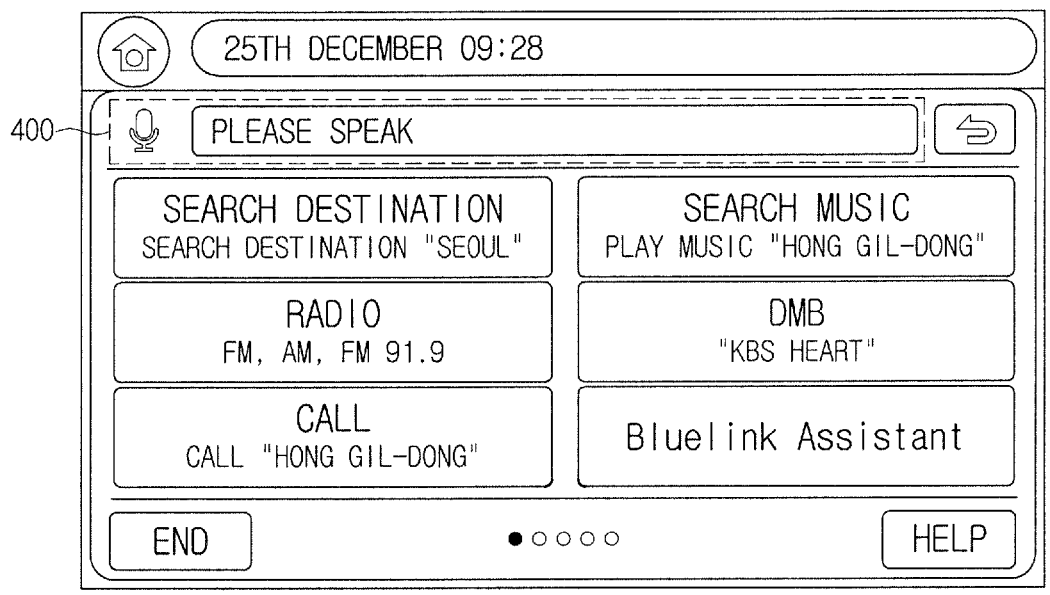
FIG. 9 shows a screen for requesting a user to input a speech command through a display unit.
Figure 10:
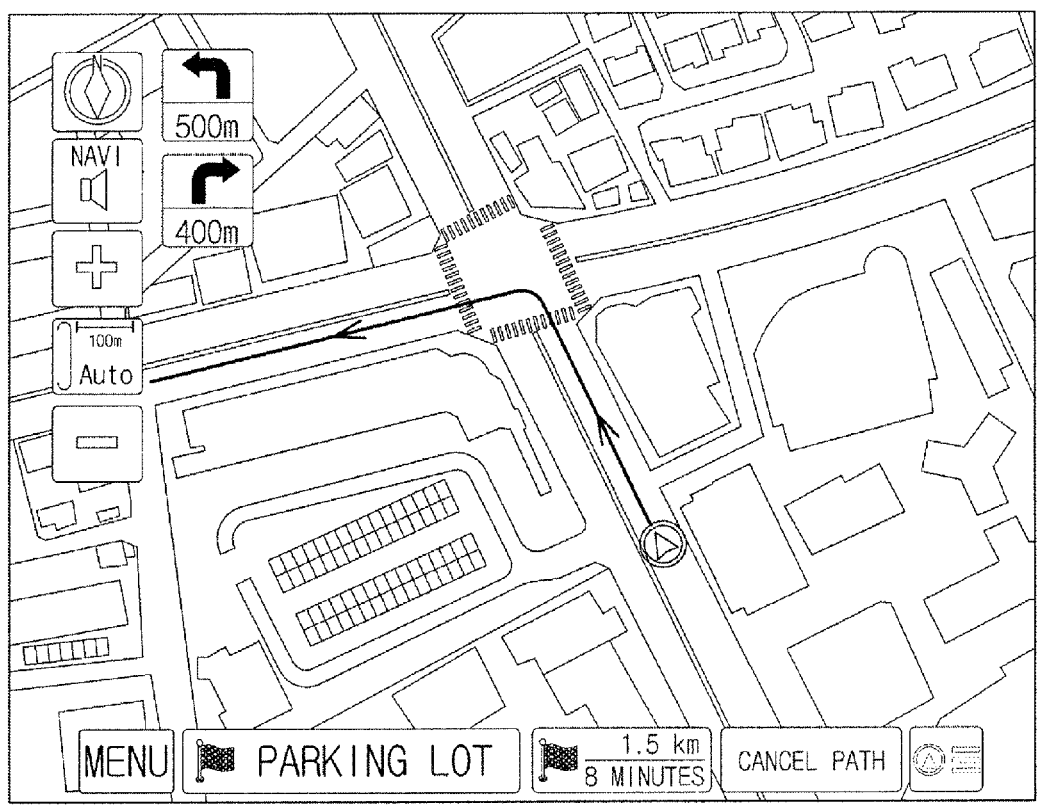
FIG. 10 shows a screen that displays a route to a destination according to the results of processing on a speech command.

FIG. 8 is a flowchart illustrating a method in which the speech recognition apparatus identifies a user's speech command from the results of processing acquired by a plurality of user terminals, and processes the user's speech command, FIG. 9 shows a screen for requesting a user to input a speech command through a display unit, and FIG. 10 shows a screen that displays a route to a destination according to the results of processing on a speech command.

The speech recognition apparatus may perform speech recognition, in operation 800. More specifically, the speech recognition apparatus may activate the speech recognition module, and interwork with the speech recognition server to activate a speech recognition module of at least one user terminal located around the speech recognition apparatus. At this time, the speech recognition apparatus may identify the user terminal located around the speech recognition apparatus using location information, as described above. As another example, the speech recognition apparatus may activate a speech recognition module of at least one user terminal connected through a Bluetooth communication network.

The speech recognition apparatus and the at least one user terminal may receive a speech through their speech input units, respectively. Accordingly, the speech recognition apparatus may receive the result of speech recognition and a speech waveform acquired by the user terminal, from the speech recognition server.

According to a form, the speech recognition apparatus may display a pop-up message for requesting a user to input a speech, through the display unit. Referring to FIG. 9, the speech recognition apparatus may display a pop-up message 400 including text "Please Speak" through the display unit.

The speech recognition apparatus may compare a speech waveform acquired by the speech recognition apparatus to the speech waveform acquired by the user terminal, in operation 805. More specifically, the speech recognition apparatus may determine whether the shape of the speech waveform acquired by the speech recognition apparatus is similar to the shape of the speech waveform acquired by the user terminal, in operation 810. If the speech recognition apparatus determines that the shape of the speech waveform acquired by the speech recognition apparatus is similar to the shape of the speech waveform acquired by the user terminal, the speech recognition apparatus may determine whether the number of the result of speech recognition acquired by itself is one, in operation 815. If the speech recognition apparatus determines that the number of the result of speech recognition acquired by itself is one, the speech recognition apparatus may determine whether the acquired result of speech recognition is included in the result of speech recognition acquired by the user terminal, in operations 820 and 825. If the speech recognition apparatus determines that the result of speech recognition matches with the result of speech recognition acquired by the user terminal, the speech recognition apparatus may determine that the user's speech recognition fails, in operation 830, and request the user to again input a speech.

Meanwhile, if the speech recognition apparatus determines that the shape of the speech waveform acquired by the speech recognition apparatus is different from the shape of the speech waveform acquired by the user terminal, and that a plurality of results of speech recognition are acquired, the speech recognition apparatus may create a list including the plurality of results of speech recognition acquired from the user's speech, in operation 835. For example, the speech recognition apparatus may display the list through the display unit to induce the user to select one result of speech recognition from the list. According to a form, if the result of speech recognition acquired from the user's speech is "Gyeongju", the speech recognition apparatus may display a list including various services related to Gyeongju, such as a destination search service related to Gyeongju, a weather search service related to Gyeongju, and a local information service related to Gyeongju.

Meanwhile, if the speech recognition apparatus determines that the number of the result of speech recognition acquired by itself is one, and that the result of speech recognition is not included in the result of speech recognition acquired from the user terminal, the speech recognition apparatus may determine that the acquired result of speech recognition is exact, and output the result of speech recognition, in operation 840. For example, the speech recognition apparatus may display the result of speech recognition through the display unit, or output the result of speech recognition through the speaker. Also, the speech recognition apparatus may control a device in the vehicle to execute a service corresponding to the result of speech recognition.

However, if the speech recognition apparatus determines that the shape of the speech waveform acquired by itself is different from the shape of the speech waveform acquired by the user terminal, and that a plurality of results of speech recognition are acquired by the speech recognition apparatus, the speech recognition apparatus may compare the results of speech recognition acquired by both devices (that is, the speech recognition apparatus and the user terminal) to each other, in operation 845. Then, the speech recognition apparatus may determine the result of speech recognition acquired in common by the both device, as noise, and delete the result of speech recognition from the list, in operation 850. Then, the speech recognition apparatus may determine whether there remains any result of speech recognition, operation 855. If the speech recognition apparatus determines that there remains the result of speech recognition, the speech recognition apparatus may output the result of speech recognition, in operation 860.

The method according to the above-described embodiment can be embodied in the form of program instructions, which can be performed through various computer means, and can be written in computer-readable recording medium. The computer-readable recording medium can include program instructions, data files, data structures, and the combination thereof. The program instructions stored in the storage medium can be designed and configured specifically for an exemplary embodiment or can be publically known and available to those who are skilled in the field of computer software. Examples of the computer-readable recording medium can include magnetic media, such as a hard disk, a floppy disk, and a magnetic tape, optical media, such as CD-ROM and DVD, magneto-optical media, such as a floptical disk, and hardware devices, such as ROM, RAM and flash memory, which are specifically configured to store and run program instructions.

Examples of program instructions include both machine code, such as produced by a compiler, and high-level language code that may be executed on the computer using an interpreter. The hardware devices may be configured to act as one or more software modules in order to perform the operations of the above-described embodiments, or vice versa.

Although embodiments have been described by specific examples and drawings, it will be understood to those of ordinary skill in the art that various adjustments and modifications are possible from the above description. For example, although the described techniques are performed in a different order, and/or the described system, architecture, device, or circuit component are coupled or combined in a different form or substituted/replaced with another component or equivalent, suitable results can be achieved.

Therefore, other implementations, other embodiments, and things equivalent to claims are within the scope of the claims to be described below.

What is claimed is:

1. A speech recognition apparatus comprising:
    a speech input unit configured to receive a speech command from a user;
    a communication unit configured to receive a result of processing for speech recognition acquired by at least one user terminal; and
    a controller configured to:
        compare a result of processing for speech recognition acquired from the speech command to the result of processing for speech recognition acquired by the at least one user terminal, and
        when a speech waveform acquired from the speech command received by the speech input unit is determined to be different from a speech waveform acquired by the at least one user terminal and a number of the result of processing for speech recognition acquired from the speech command is determined to be one, control a device in the vehicle based on the result of processing for speech recognition acquired from the speech command.

2. The speech recognition apparatus according to claim 1, wherein when the speech command is received from the user, the communication unit is configured to request activation of a speech recognition module of the at least one user terminal located near the user.

3. The speech recognition apparatus according to claim 1, wherein the controller is further configured to compare the speech waveform acquired from the speech command to the speech waveform acquired by the at least one user terminal and process the speech command based on the comparison of the speech waveforms.

4. The speech recognition apparatus according to claim 3, wherein when the controller determines that the speech waveform acquired from the speech command is different from the speech waveform acquired by the at least one user terminal, that the number of the result of speech recognition acquired from the speech command is one, and that the acquired result of speech recognition is identical to the result of speech recognition acquired by the at least one user terminal, the controller is configured to request the user to input a speech command again.

5. The speech recognition apparatus according to claim 1, wherein when the controller determines that a speech waveform acquired from the speech command is different from a speech waveform acquired by the at least one user terminal, and that a plurality of results of speech recognition are acquired from the speech command, the controller is configured to exclude the result of speech recognition acquired by the at least one user terminal from among the plurality of results of speech recognition.

6. The speech recognition apparatus according to claim 5, wherein the controller is configured to control the device in the vehicle to provide a speech recognition result list in which the result of speech recognition acquired by the at least one user terminal is excluded from among the plurality of results of speech recognition.

7. A vehicle comprising:
    a speech recognition module configured to recognize a speech uttered by a user;

a communication unit configured to receive a result of processing for speech recognition acquired by at least one user terminal; and a controller configured to:
- compare a result of processing for speech recognition acquired by the speech recognition module to the result of processing for speech recognition acquired by the at least one user terminal, and to control a device in the vehicle based on the comparison; and
- when the controller determines a speech waveform of the speech uttered from the user is different from a speech waveform acquired by the at least one user terminal and determines a number of the result of processing for speech recognition acquired by the speech recognition module is one, control the device in the vehicle based on the result of processing for speech recognition acquired by the speech recognition module.

8. The vehicle according to claim 7, wherein when the speech recognition module is activated, the communication unit is configured to request activation of a speech recognition module of the at least one user terminal.

9. The vehicle according to claim 7, wherein the controller is further configured to compare the speech waveform of the speech uttered from the user to the speech waveform acquired by the at least one user terminal, and control the device in the vehicle based on the comparison of the speech waveforms.

10. The vehicle according to claim 7, wherein when the controller determines that a speech waveform of the speech uttered from the user is different from a speech waveform acquired by the at least one user terminal, that the number of the result of speech recognition acquired by the speech input module is one, and that the acquired result of speech recognition is identical to the result of speech recognition acquired by the at least one user terminal, the controller is configured to request the user to input a speech again.

11. The vehicle according to claim 7, wherein when the controller determines that a speech waveform of the speech uttered from the user is different from a speech waveform acquired by the at least one user terminal, and that a plurality of results of speech recognition are acquired by the speech recognition module, the controller is configured to exclude the result of speech recognition acquired by the at least one user terminal from among the plurality of results of speech recognition.

12. The vehicle according to claim 11, wherein the controller is configured to control the device in the vehicle to provide a speech recognition result list in which the result of speech recognition acquired from the at least one user terminal is excluded from among the plurality of results of speech recognition.

13. A method of controlling a vehicle comprising:
- recognizing, by a speech recognition module, a speech uttered from a user;
- receiving a result of processing for speech recognition acquired by at least one user terminal; and
- comparing a result of processing for speech recognition acquired by the speech recognition module to the result of processing for speech recognition acquired by the at least one user terminal; and
- when a speech waveform of the speech uttered from the user is determined to be different from a speech waveform acquired by the at least one user terminal and a number of the result of speech recognition acquired by the speech recognition module is one, controlling the device in the vehicle based on the result of speech recognition acquired by the speech recognition module.

14. The method according to claim 13, wherein receiving the result of processing for speech recognition further comprises requesting activation of a speech recognition module of the at least one user terminal.

15. The method according to claim 13, wherein controlling the device in the vehicle comprises comparing the speech waveform of the speech uttered from the user to the speech waveform acquired by the at least one user terminal, and controlling the device in the vehicle based on the comparison of the speech waveforms.

16. The method according to claim 13, wherein controlling the device in the vehicle comprises, when a speech waveform of the speech uttered from the user is determined to be different from a speech waveform acquired by the at least one user terminal, the number of the result of speech recognition acquired by the speech recognition module is one, and the acquired result of speech recognition is identical to the result of speech recognition acquired by the at least one user terminal, requesting the user to input a speech again.

17. The method according to claim 13, wherein controlling the device in the vehicle comprises, when a speech waveform of the speech uttered from the user is determined to be different from a speech waveform acquired by the at least one user terminal, and a plurality of results of speech recognition are acquired by the speech recognition module, excluding the result of speech recognition acquired by the at least one user terminal from among the plurality of results of speech recognition.

* * * * *